(12) United States Patent
Kennedy et al.

(10) Patent No.: US 6,189,977 B1
(45) Date of Patent: Feb. 20, 2001

(54) GO KART WHEEL

(76) Inventors: Jason Brent Kennedy; Patrick Michael Kennedy; Laurence Michael Kennedy, all of 31 Blantyre Avenue, Chelsea, Vic (AU), 3196

( * ) Notice: Under 35 U.S.C. 154(b), the term of this patent shall be extended for 0 days.

(21) Appl. No.: 09/205,885

(22) Filed: Dec. 4, 1998

(51) Int. Cl.[7] .............................. B60B 7/14; B60B 21/10
(52) U.S. Cl. ............................... 301/37.38; 301/108.5; 152/379.5
(58) Field of Search .................. 301/37.1, 37.37, 301/37.38, 108.1, 108.4, 108.5, 37.25, 9.2, 126, 105.1, 108.2, 108.3; 152/379.3, 379.4, 379.5, 384

(56) References Cited

U.S. PATENT DOCUMENTS

| | | | |
|---|---|---|---|
| 2,031,092 | * 2/1936 | Begg | 301/37.37 |
| 2,148,995 | * 2/1939 | Nelson | 301/108.3 |
| 2,304,584 | * 12/1942 | Lyon | 301/108.1 |
| 2,923,573 | * 2/1960 | Lyon | 301/108.1 |
| 2,969,257 | * 1/1961 | Lyon | 301/37.38 |
| 3,092,420 | * 6/1963 | Baldwin et al. | 301/37.38 |
| 3,554,536 | * 1/1971 | Richter | 301/108.4 |
| 3,883,181 | * 5/1975 | Dissinger | 301/108.1 |
| 4,448,456 | * 5/1984 | Pfundstein | 301/108.5 |
| 4,453,582 | * 6/1984 | Patecell | 152/381.4 |
| 4,763,920 | * 8/1988 | Huidekoper | 301/108.1 |
| 4,971,396 | * 11/1990 | Morris | 301/108.4 |
| 5,145,277 | * 9/1992 | Fujita et al. | 301/111 |
| 5,174,680 | * 12/1992 | Nakamura et al. | 301/111 |
| 5,197,786 | * 3/1993 | Eschenburg | 301/124.1 |
| 5,222,785 | * 6/1993 | Green | 301/108.4 |
| 5,324,099 | * 6/1994 | Fitzhugh | 301/37.37 |
| 5,443,582 | * 8/1995 | Ching | 301/37.37 |
| 5,603,554 | * 2/1997 | Monroe et al. | 301/105.1 |
| 5,752,746 | * 5/1998 | Perry | 301/108.4 |
| 5,992,942 | * 11/1999 | Passoth et al. | 301/37.1 |
| 6,017,096 | * 1/2000 | Russell | 301/37.37 |
| 6,030,049 | * 2/2000 | Russell | 301/37.37 |

* cited by examiner

Primary Examiner—S. Joseph Morano
Assistant Examiner—Jason R. Bellinger
(74) Attorney, Agent, or Firm—Thomas R. Vigil

(57) ABSTRACT

The go kart wheel assembly comprises a hub assembly, including a hub, a tire mounted on the hub and a hub cover. The hub includes an outboard peripheral flange and a single hole for receiving a first fastening fastener and at least one projection for cooperating with corresponding projections on the hub cover. The hub cover has at least one projection for cooperative engagement in abating relation internally with each of the at least one projections on the hub. The hub cover is adapted to be visually distinguished from a sidewall of a tire adjacent to the hub cover. Finally, the hub cover is positioned thereby to prevent entering of water into the hub assembly of the go kart wheel assembly at least approximately in a plane which includes the outboard peripheral flange on the hub and is securely held. In this position, generally completely over the outboard peripheral flange by passing the first fastener through the cover so as to be located within the hole and mating the at least one projection on the cover with the corresponding at least one projection on the hub.

17 Claims, 4 Drawing Sheets

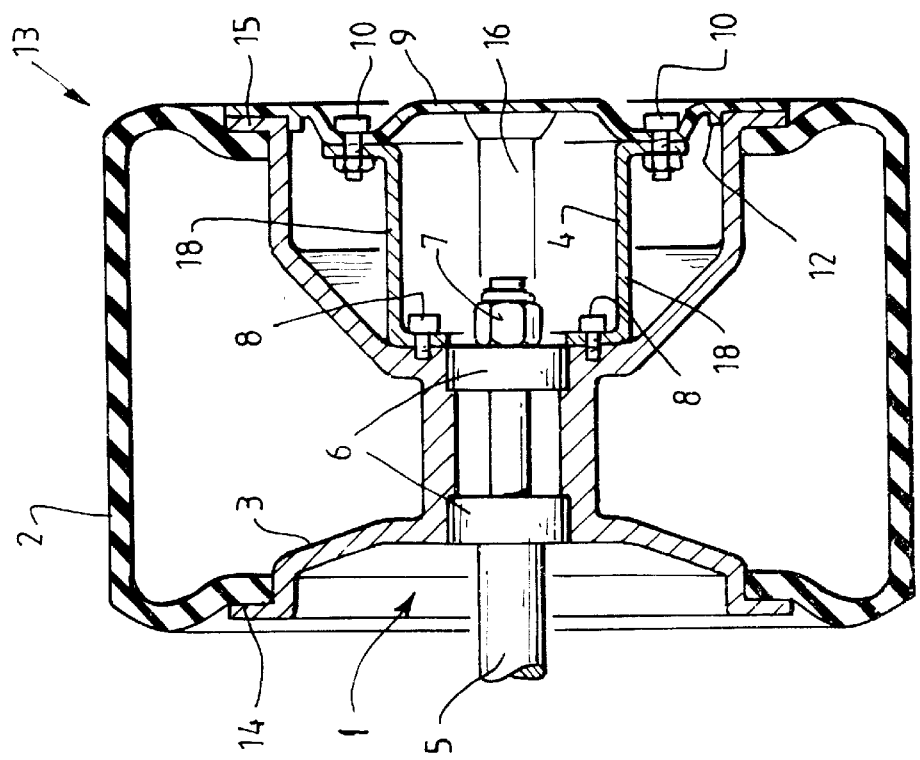
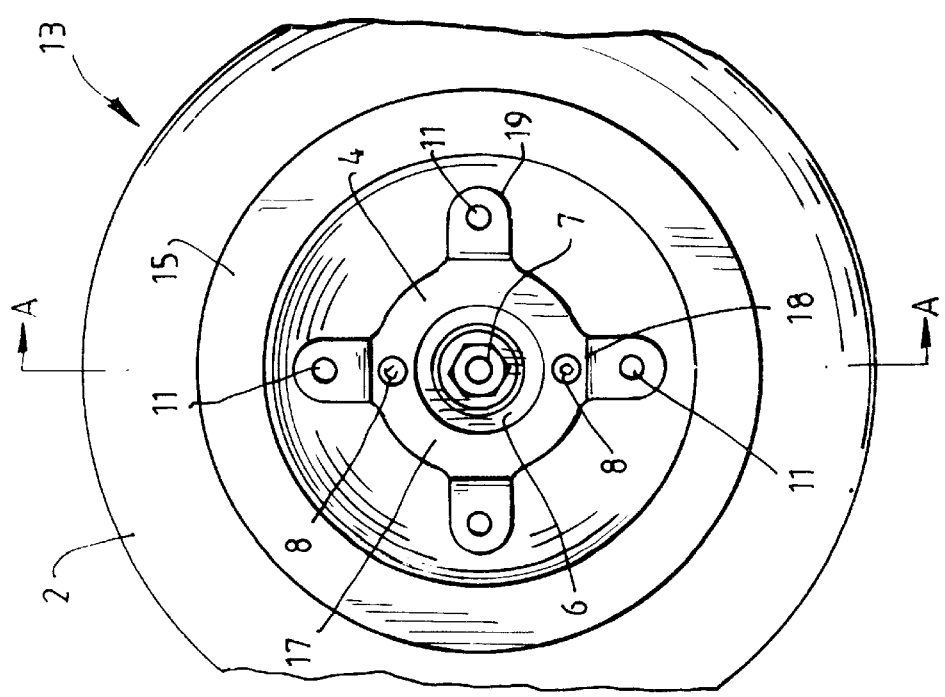
FIG. 2.
FIG. 1.

GO KART WHEEL

FIELD OF THE INVENTION

This invention relates to wheels for go karts.

BACKGROUND TO THE INVENTION

Go karts are motor vehicles used for recreational purposes including racing. They are similar to conventional racing motor vehicles, but are generally of smaller scale.

A go kart normally has four wheels comprising pneumatic tires mounted on hub assemblies.

The hub assembly of a typical go kart wheel includes a, generally cylindrical rim with peripheral flanges, adapted for the mounting and retention of a tire, and a central part within the rim. The central part, herein for convenience called the web, may in an undriven wheel accommodate rolling element bearings with inner races adapted to fit on to a stub axle, or in a driven wheel include a mounting flange for bolting to a collar which is secured to a drive shaft.

A generally cylindrical space is defined by an inner surface of the rim, a plane passing through the outboard (that is, remote from the go kart's chassis) peripheral flange of the hub and an outboard face of the web and may be a considerable fraction of a go kart wheel's volume, particularly if the gap between the peripheral flanges is comparable to or larger than the diameter of the rim, as is commonly the case. That is, the wheel may be deeply "dished".

This space contributes to eddying of air and therefore to the aerodynamic drag of a wheel, and may be prone to accumulate grease and road grime0 and, given its small size compared to the corresponding space on a full size vehicle's wheel, be difficult to clean. The present invention may alleviate these problems.

A further problem associated with go karts is that as they operate in close proximity to each other when racing, there is a danger of accidental contact between their wheels, with an attendant risk of injury to drivers. A first go kart driver's visual perception of the position of the wheels of a second go kart close to his own may be enhanced, and the possibility of an accident may thereby be reduced, if the second go kart is fitted with wheels according to the invention.

The invention may be applied to both existing go kart wheels and to wheels of new manufacture.

SUMMARY OF THE INENTION

According to the invention there is provided a go kart wheel comprising;
- a hub assembly including a hub adapted for mounting on an axle;
- a tire mounted to the hub; and
- a hub cover secured to the hub assembly,
- wherein the hub cover is adapted to be visually distinguishable from a sidewall of the tire adjacent to the hub cover.

PREFERRD ASPECTS OF THE INVENTION

Preferably, the hub cover is secured to the hub assembly by at least one first screw fastening means.

Preferably, the hub cover lies at least approximately in a plane which includes an outboard peripheral flange of the hub.

The hub assembly may include a support member, which support member is secured to the hub by at least one second screw fastening means, and to which support member the hub cover is secured by the at least one first screw fastening means thereby to secure the hub cover to the hub assembly. The hub assembly in this aspect may be a conventional go kart wheel hub assembly.

At least one first screw fastening means may then comprise either: a bolt passing through the support member; or a stud secured to the support member, and a nut threadably engaged with the bolt or stud.

The first screw fastening means may be located in line with the center of the axle on which the go kart wheel is mounted.

The second screw fastening means may comprise a bolt or screw or stud passing through the hub.

In that case, an end of a bolt, stud or screw may project from a surface of the hub so as to lie adjacent to a bead of the tire, thereby to at least partially limit relative movement of the bead and the hub in the event of deflation of the tire.

Where the second screw fastening means comprises a bolt or screw or stud passing through the hub, the go kart wheel may be adapted to be secured to a collar keyed to the axle by at least one of the second screw fastening means.

In any of the above embodiments, the go kart wheel may include retaining means comprised of two engaging parts, wherein one part is included in the hub cover and the other is included in the hub assembly, so that the hub cover is retained on the hub assembly in combination with the first screw fastening means and the retaining means.

In this case, preferably the number of the screw fastening means is one.

Preferably, the hub cover is at least in part made of a reinforced or unreinforced plastic material.

The plastic material is preferably colored differently from the sidewall of the tire adjacent to the hub cover.

Preferably, the hub cover is generally in the form of a disc.

The hub cover may include a spigot or projections adapted to be received in a circular recess in the hub.

The invention will now be described in detail by way of four non-limiting examples of its application.

BRIEF DESCRIPTION OF THE DRAWINGS

FIG. 1 is a partial elevation of a first go kart wheel according to the invention, with a hub cover omitted.

FIG. 2 is a cross section along line A—A in FIG. 1 of the go kart wheel shown in FIG. 1 but with the hub cover fitted.

INTEGER LIST

Figure 4:
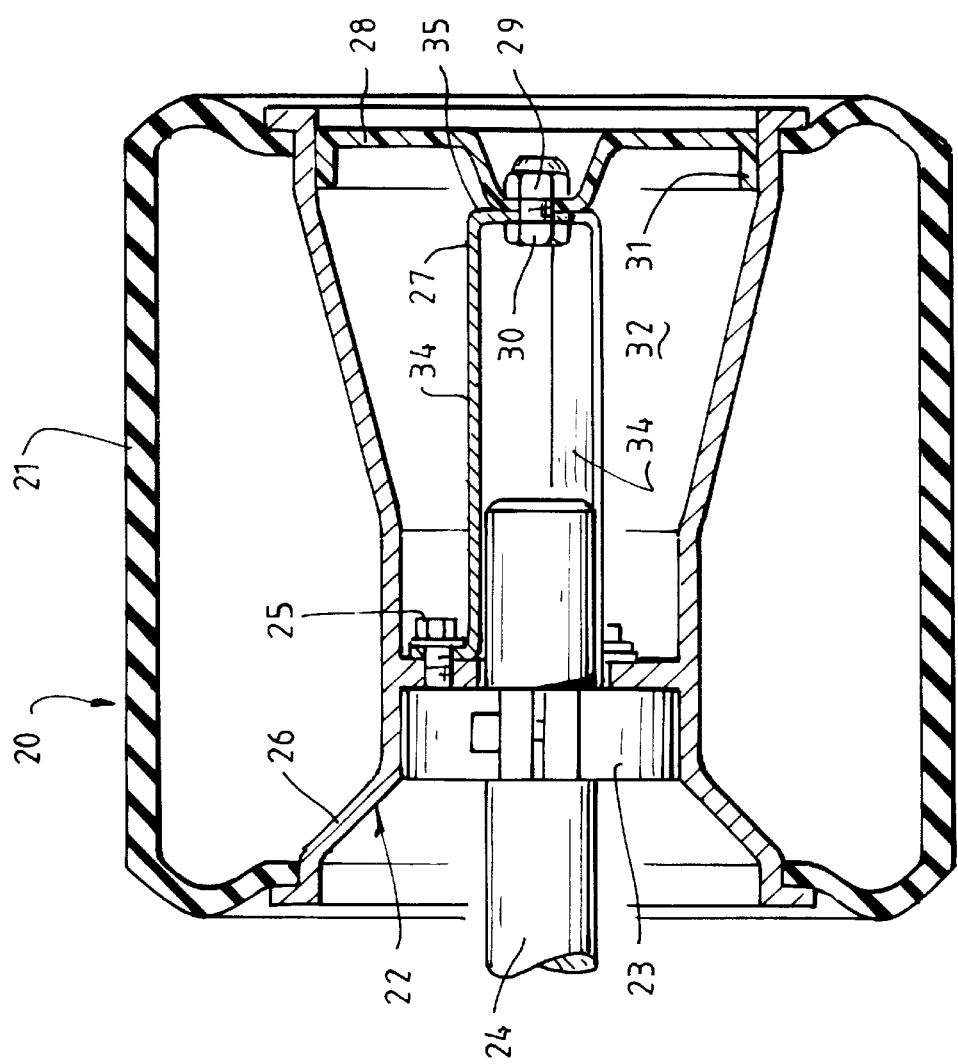
FIG. 4 is a cross section along the line B—B in FIG. 3 of the go kart wheel shown in FIG. 3 but with the hub cover fitted.

1. Hub assembly
2. Tire

3. Hub
4. Support member
5. Stub axle
6. Rolling element bearings
7. Nut
8. Screw
9. Hub cover
10. Screw fastener
11. Hole
12. Spigot
13. Go kat wheel
14. Inboard peripheral flange
15. Outboard peripheral flange
16. Space
17. Annular plate
18. Leg
19. Tabs
20. Go kart wheel
21. Tire
22. Wheel assembly
23. Collar
24. Drive shaft
25. Bolt
26. Hub
27 Support member
28. Hub cover
29. Nut
30. Bolt
31. Spigot
32. Space
33. Tab
34. Leg
35. Plate
36. Go kart wheel
37. Hub assembly
38. Hub
39. Support member
40. Bolt
41. Hole
42. Rim
43. Bead
44. Tire
45. Nut
46. Hub cover
47. Nut
48. Bolt
49. Spigot
50. Space
51. Go kart wheel
52. Tire
53. Hub assembly
54. Hub cover
55. Screw
56. Threaded hole
57. Projection
58. Projection

DESCRIPTION OF THE PREFERRED EMBODIMENTS

FIG. 1 shows a cross sectional view of a first go kart wheel 13 according to the invention. The cross section is taken along line A—A in FIG. 2.

The go kart wheel 13 comprises a hub assembly 1 to which is fitted a tire 2. The hub assembly comprises a hub 3 and a support member 4 secured to the hub 3 by two screws 8. The hub assembly also comprises a fitting for a valve for inflating the tire 2, but this has been omitted in the Figures for clarity.

The go kart wheel 13 is a front, or steering, wheel and is in use fitted to a stub axle 5. Two rolling element bearings 6 are retained in the hub 3 and fit onto the stub axle 5, and the go kart wheel 13 is secured to the stub axle 5 by a nut 7.

The tire 2 is retained on the hub 3 by inboard and outboard peripheral flanges, 14 and 15 respectively, thereon. In practice the hub 3 is typically a casting of a light metal alloy, finished by machining.

A colored plastic hub cover 9 is secured to the support member 4 by screw fasteners 10, which pass through holes 11 in the support member 4. The screw fasteners 10 are nut-and-bolt combinations, although it is to be understood that alternative arrangements are possible. For example, screws could be used alone, with the holes 11 being threaded.

The hub cover 9 is in the form of a disc of a diameter similar to that of the outboard peripheral flange 15. When secured in position as show in FIG. 2, the hub cover 9 lies against the outboard peripheral flange 15 and a circular spigot 12 on the hub cover 9 is received in the hub 3.

The hub cover 9 has been omitted in FIG. 1, thereby to show the support member 4. The support member 4 comprises an annular plate 17 secured to the hub 3 by the screws 8, four legs 18 and four tabs 19 passing through which are the holes 11.

It will be realized that many variations to the design of the support member 4 are possible, to suit different designs of the hub cover 9. For example, there may be a different number of screw fasteners 10 or they may be at different radii.

When in position on the go kart wheel 13, the hub cover 9 closes off a space 16 defined by the hub 3, thereby to reduce both eddying of air in the space 16 when the go kart wheel 13 is in use and the accumulation of road grime in the space 16.

In addition, the presence of a colored hub cover, 9 in or close to a plane containing the outboard peripheral flange 15 of the go kart wheel 13 may improve the ability of a driver of a go kart close to a go kart to which the go kart wheel 13 is fitted to judge the two go karts' relative positions, particularly in poor light conditions, and thereby to avoid a collision.

The hub 3 shown in FIGS. 1 and 2 is similar to those in many existing go kart wheels, so that the arrangement shown in FIGS. 1 and 2 mnay not only be suited to the manufacture of new go kart wheels, but may be used in the fitting of hub covers to existing go kart wheel hub assemblies.

Figure 3:
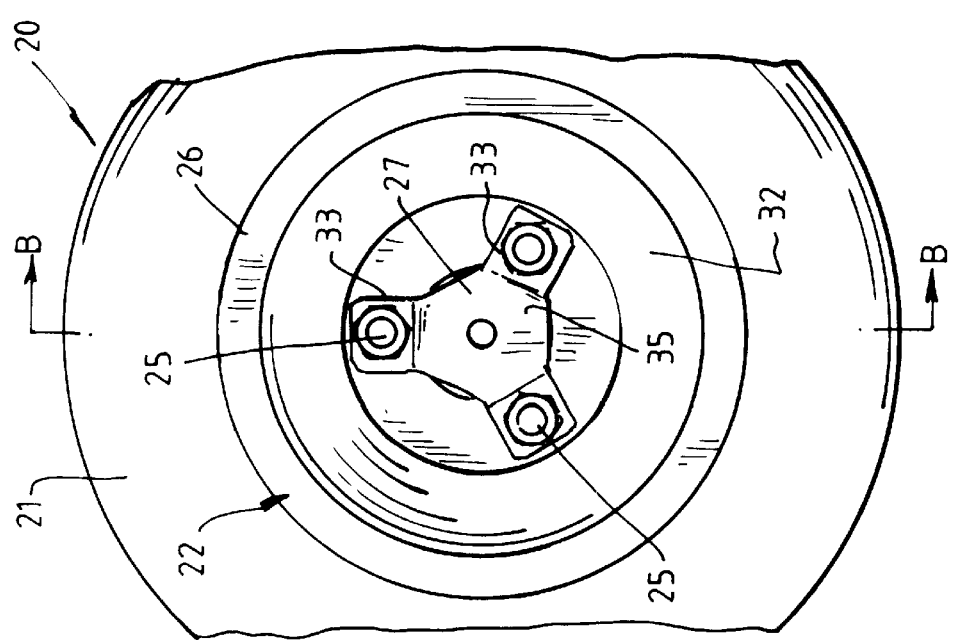
FIG. 3 is a partial elevation of a second go kart wheel according to the invention, with a hub cover omitted.

A second go kart wheel according to the invention, 20, is, shown in FIGS. 3 and 4. The go kart wheel 20 is typical of driven (rear) wheels of go karts, inasmuch as it comprises a tire 21 mounted on a hub assembly 22 which is secured to a collar 23 keyed to a drive shaft 24 by bolts 25.

The hub assembly 22 comprises a hub 26, molded from light metal alloy, and a support member 27. The support member 27 is secured to the hub 26 by the bolts 25.

A hub cover 28 is secured to the support member 27 by a nut 29 and bolt 30 on the rotational axis of go kart wheel 20. The bolt 30 is captive in tire support member 27.

The colored plastic hub cover 28 is in the form of a disc with a spigot 31 which is received in the space 32 created by the "dished" form of the hub 26.

The hub cover 28 has been omitted in FIG. 3 to show the support member 27. The support member 27 comprises three tabs 33 through which pass bolts 25, tree legs 34 and a plate 35 through which passes the bolt 30. The legs 34 are of such length as to locate the hub cover 28 in the position shown and to enable the drive shaft 24 to be moved within the collar 23 as is done to enable variation of the track of a go kart.

The hub cover 28 closes off the space 32 thereby to reduce eddying of air in the space 32 and accumulation of road grime therein, and to provide enhanced visibility to the go kart wheel as described above.

The arrangement shown in FIGS. 3 and 4 is also suited for retrospective fitting of a hub cover to an existing go kart wheel of the type shown, as well as for the manufacture of new go kart wheels.

Figure 6:
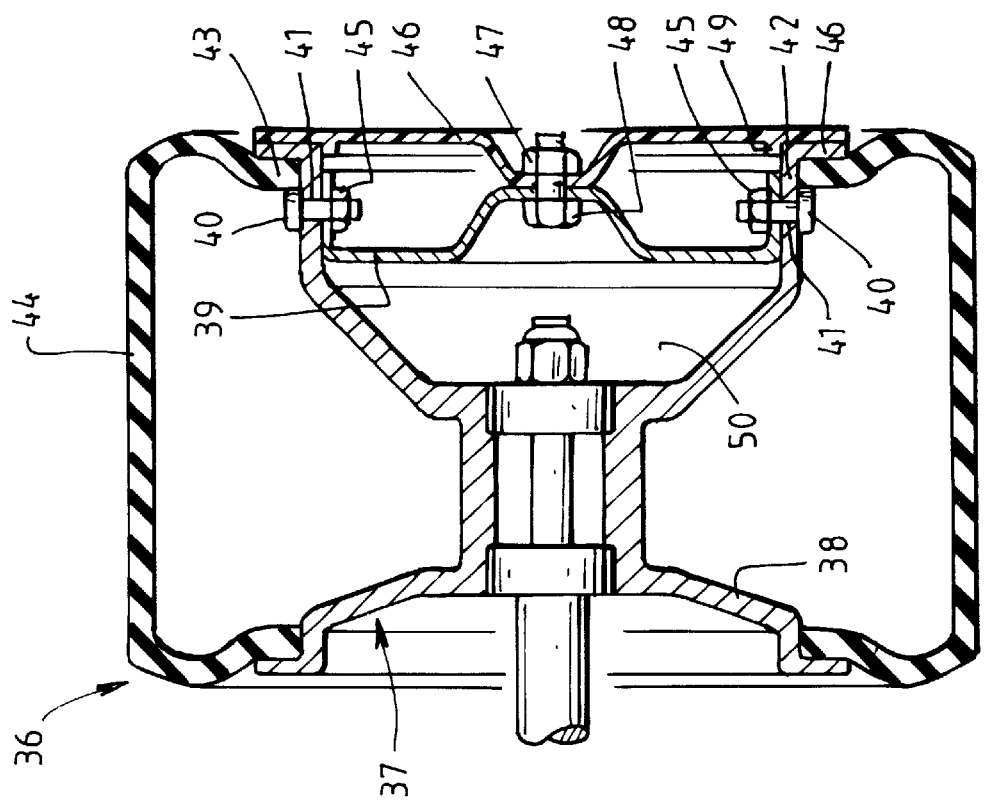
FIG. 6 is a cross section along the line C—C in FIG. 5 of the go kart wheel shown in FIG. 5 but with the hub cover fitted.
Figure 5:
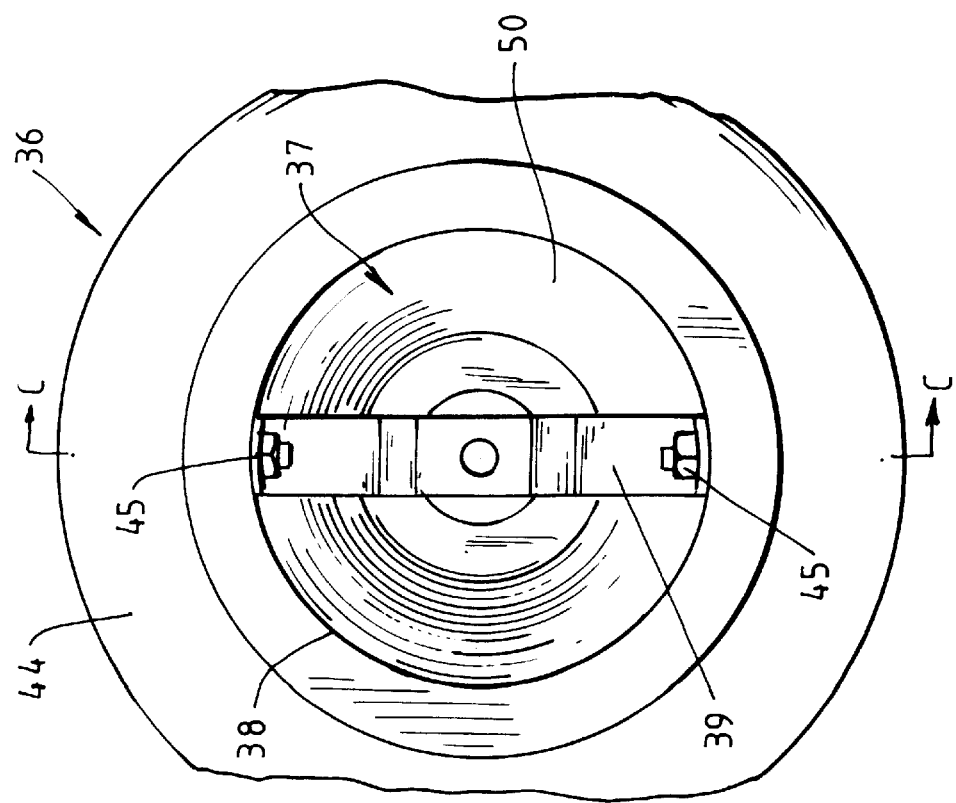
FIG. 5 is a partial elevation of a third go kart wheel according to the invention, with a hub cover omnitted.

FIGS. 5 and 6 show yet another go kart wheel 36 according to the invention. The go kart wheel 36 is generally of the same tire as the go kart wheel 13, having a tire 44 on a hub assembly 37 which includes a hub 38. The hub assembly 37 further includes a support member 39, secured to the hub 38 by two bolts 40 passing through holes 41 in a rim 42 of the hub 38 and having nuts 45. Although it is not essential, the holes 41 are so located that a bead 43 of the tire 44 is retained between the screws 40 and an outboard peripheral flange 46 of the go kart wheel 36, thereby to limit relative movement of the bead 43 and the hub 38 in the event of sudden deflation of the tire 44.

A colored plastic hub cover 46 is secured to the support member 39 by a nut 47 and bolt 48. The hub cover 46 has a spigot 49, and closes off the space 50 within the hub.

The visibility, at least partial freedom from eddying of air and accumulation of road grime within the hub of the go kart wheel 36 are as described above for go kart wheels 13 and 20.

Figure 8:
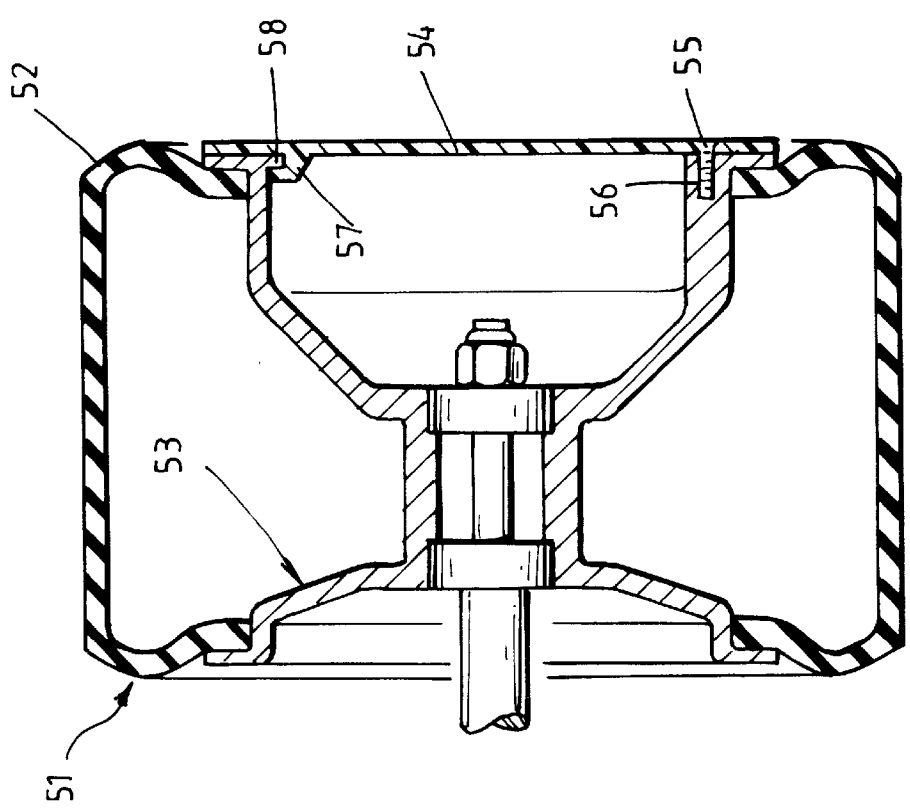
FIG. 8 is a cross section along lines and X-P-Z in FIG. 7 of the go kart wheel shown in FIG. 7, but with hub cover fitted.
Figure 7:
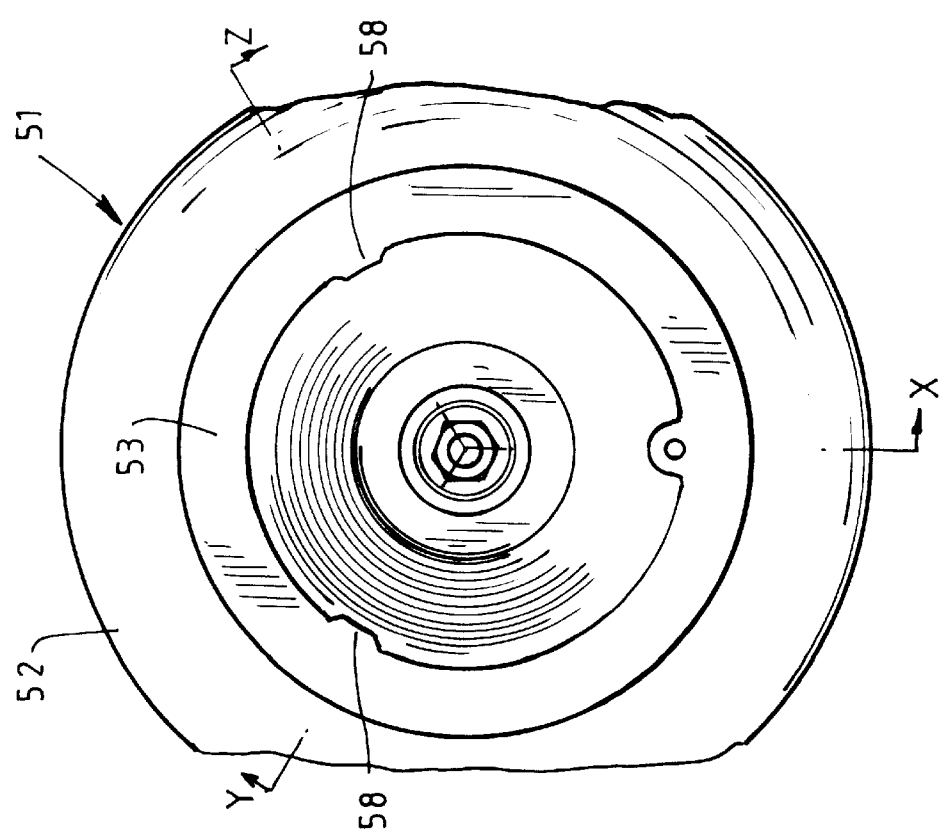
FIG. 7 is a partial elevation of a fourth go kart wheel according to the invention, with a hub cover omitted.

FIGS. 7 and 8 show still another go kart wheel 51 according to the invention. The go kart wheel 51 is generally of the same type as the go kart wheel 13, having a tire 52 on a hub assembly 53. In this case, a colored plastic hub cover 54 is secured to the hub assembly 53 by a screw 55 received in a threaded hole 56 in the hub assembly 53. The hub cover 54 has two projections 57 which cooperate with two projections 58 on the hub assembly 53, so that the hub cover is positively retained on the hub assembly 53 at three points on its periphery, but with only a single screw 55.

The projections 58 require the provision of a hub assembly manufactured especially for the mounting of the hub cover 54 by contrast to the arrangements shown in FIGS. 1 to 6 which may be realized with existing go kart wheels. However, the general principle shown in FIGS. 7 and 8 may be realized with some existing hub assemblies by a person skilled in the art by the provision of a support member (otherwise similar in principle to support members 4, 27 and 37) incorporating projections analogous to projections 58 and providing a hub cover with cooperating projections analogous to projections 57.

It will be realized that many variations to the above arrangements may be made without departing from the spirit and ambit of the invention. For example, decorative designs may be applied to, or incorporated in, the hub covers,

What is claimed is:

1. A go kart wheel assembly comprising:
    a hub assembly including a hub having an axis, said hub including a flange defining a planar portion extending radially outwardly from said axis and said hub including an inner wall with a generally cylindrical passage therethough adapted for receiving an axle,
    mounting structure mounted to said hub for mounting a hub cover to said hub with fastening means;
    a tire mounted to the hub;
    a hub cover having fastening means for cooperative engagement in abutting relation internally with said mounting structure mounted on said hub, said hub cover further being adapted to be visually distinguishable from a sidewall of the tire adjacent to the hub cover; and
    wherein said hub cover is positioned generally in a plane which is adjacent to and parallel to said flange planar portion and extends to an outer periphery of said flange planar portion on said hub and is securely held in such a position generally completely over said flange planar portion by passing said fastening means through said cover so as to be located within and fixed to said mounting structure thereby to prevent entry of water into said hub assembly of said go kart wheel assembly.

2. A go kart wheel assembly according to claim 1 wherein said mounting structure includes a support member located in the hub between the hub cover and the hub.

3. A go kart wheel assembly according to claim 2 wherein the support member is secured to the hub by at least one screw fastening means.

4. A go kart wheel assembly according to claim 2 wherein the fastening means comprises a bolt passing through the support member and a nut threadably engaged with the bolt.

5. A go kart wheel assembly according to claim 2 wherein the screw fastening means comprises a stud secured to the support member and a nut threadably engaged with the stud.

6. A go kart wheel assembly according to claim 2 wherein the number of screw fastening means is one.

7. A go kart wheel assembly according to claim 6 wherein the screw fastening means for fastening the hub cover to the support member is located in line with the center of the axle on which the go kart is mounted.

8. A go kart wheel assembly according to claim 3 wherein the screw fastening means comprises a bolt or screw or stud passing through the hub.

9. A go kart wheel assembly according to claim 8 wherein the bolt, stud or screw projects laterally or radially through a cylindrical wall of the support member and through a cylindrical wall of the hub so as to be positioned adjacent to a bead of the tire.

10. A go kart wheel assembly according to claim 2 wherein the hub inner wall is secured to a collar keyed to the axle by at least one of screw fastening means.

11. A go kart wheel assembly according to claim 1 wherein the go kart wheel includes a retaining means comprised of two engaging parts.

12. A go kart wheel assembly according to claim 11 wherein one part of the two engaging parts is included in the hub cover and the second part is included in the hub assembly.

13. A go kart wheel assembly according to claim 1 wherein the hub cover is at least in part made of a reinforced or unreinforced plastics material.

14. A go kart wheel assembly according to claim 13 wherein the plastics material is colored differently from the sidewall of the tire adjacent to the hub cover.

15. A go kart wheel assembly according to claim 1 wherein the hub is cover is generally in the form of a disc.

16. A go kart wheel assembly according to claim 15 wherein the hub cover includes a spigot or projections to be received in circular recess in the hub.

17. A go kart wheel assembly comprising:

a hub assembly including a hub having an axis, said hub including a flange defining a planar portion extending radially outwardly from said axis and an inner wall with a generally cylindrical passage therethrough adapted for receiving an axle and a cavity being defined between said flange and said inner wall;

mounting structure for including a support member mounted to said inner wall and extending outwardly toward said flange in said cavity;

a tire mounted to the hub;

a hub cover having fastening means for co-operative engagement in abutting relation, internally within said cavity, to an outer end of said support member, said hub cover lying in a plane which is adjacent to, parallel to and located inwardly of a plane containing said flange planar portion, and said hub cover further being adapted to be visually distinguishable from a sidewall of the tire adjacent to the hub cover; and wherein said hub cover is positioned completely over said cylindrical passage and fixed by said fastening means to said support member so as to completely cover said cylindrical passage thereby to prevent entry of water into said hub assembly of said go kart wheel assembly.

* * * * *